Patented June 26, 1945

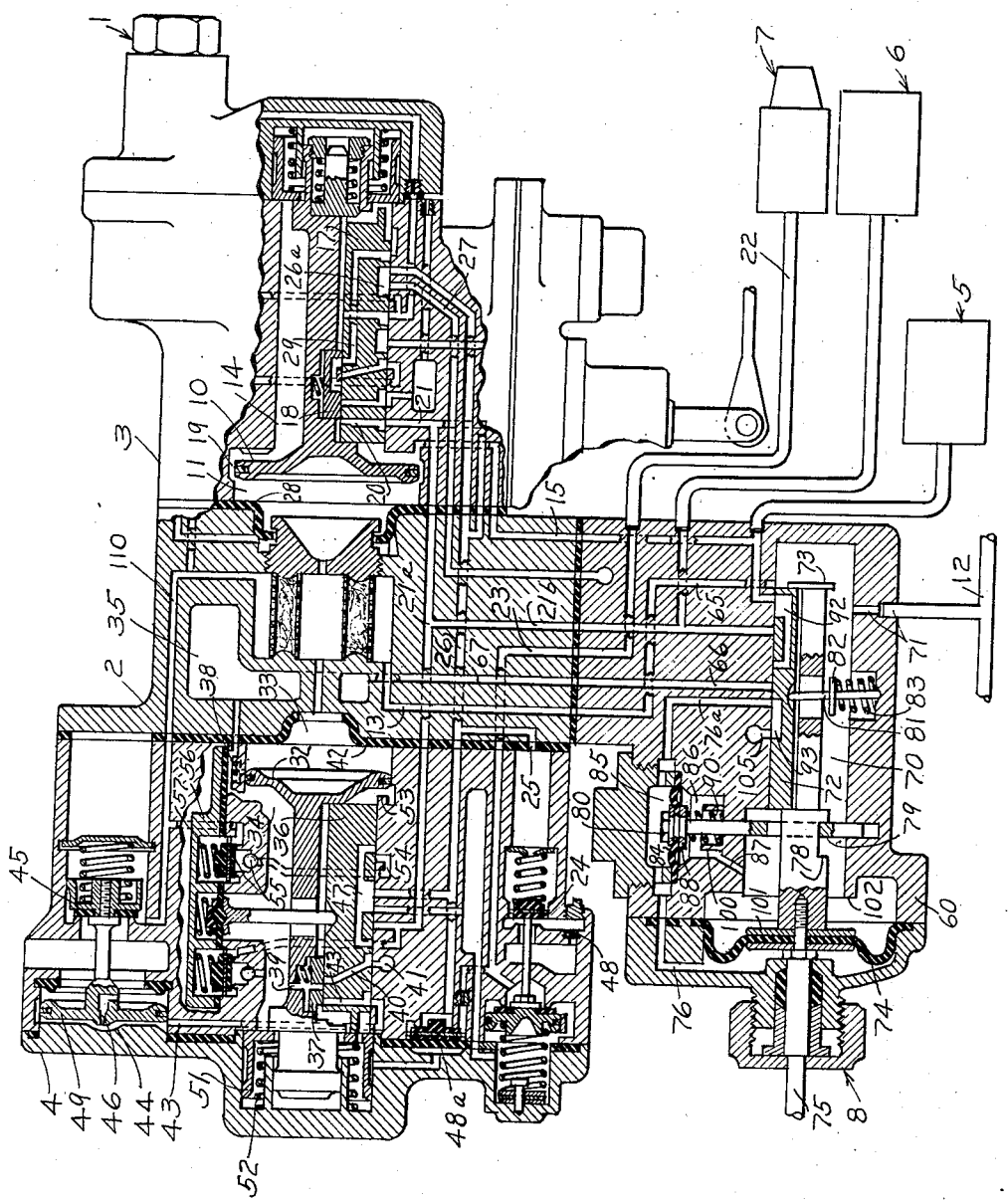

2,379,329

UNITED STATES PATENT OFFICE 2,379,329

BRAKE RELEASING APPARATUS

Ralph T. Whitney, Irwin, Pa., assignor to The Westinghouse Air Brake Company, Wilmerding, Pa., a corporation of Pennsylvania Application December 23, 1943, Serial No. 515,364

14 Claims. (Cl. 303—68)

This invention relates to fluid pressure brake apparatus of the automatic type and more particularly to means for causing operation of said apparatus to effect a release of the brakes.

When a car equipped with automatic brake apparatus and having the reservoir or reservoirs thereof charged with fluid under pressure is cut out of a train and the brake pipe on the car is vented, the brake controlling valve device will, as a result of such venting, move to emergency position. Movement of the brake controlling valve device to emergency position establishes communication between the reservoir or reservoirs and the brake cylinder device and permits the fluid in said reservoir or reservoirs to equalize into the brake cylinder device to effect an emergency application of the brakes on the car.

When releasing a brake application thus effected, the usual practice has been for a trainman to operate the reservoir release valve or valves to completely dissipate the fluid pressure from the reservoir or reservoirs and thereby from the connected brake cylinder device to release the brakes. This operation not only wastes the stored fluid pressure in the reservoir or reservoirs but also requires time on the part of the trainman since he must hold the reservoir release valve or valves open until the brakes are released. When a car is subsequently placed in a train, it is then necessary to completely recharge the reservoir or reservoirs either by a local yard charging plant or by a coupled locomotive before the train may be moved. This requires a relatively long period of time and consequently excessive use and wear of apparatus to accomplish same, all of which is undesirable.

From the foregoing it will be understood that it is undesirable to dissipate the stored fluid pressure in the reservoir or reservoirs to effect a release of the brakes when the car it cut out of a train, and one object of the invention is the provision of novel brake release means for accomplishing this result.

According to the invention this object is attained by brake release means, which, though not limited in use to any specific triple valve or the like, is particularly arranged for attachment to the pipe bracket of the well known "AB" valve. This brake release means embodies a slide valve having a normal position opening communication between the brake pipe on the car and the brake pipe passage in the "AB" valve, a second position for closing said communication and for connecting the auxiliary reservoir on the car to the brake pipe passage in the "AB" valve and a third position for maintaining said communication closed, and for disconnecting the auxiliary reservoir from the brake pipe passage in the "AB" valve and for in addition connecting said brake pipe passage in the "AB" valve to the emergency reservoir on the car. This brake release means provides for equalization first of the auxiliary reservoir into the brake pipe passage in the "AB" valve, and then on top of this equalization of the emergency reservoir for effecting automatically the venting of fluid under pressure from the brake cylinder device to the atmosphere, thereby effecting a release of the brakes on the car. The slide valve of the release means is operable manually from said normal position to said second position and is automatically operative from the second position to said third position, in which latter position it will remain until the brake pipe on the car is recharged, as after the car is again cut into a train, at which time the pressure of fluid supplied to the brake pipe will automatically reset or actuate the slide valve of the release means from the third position back to its normal position to reconnect the "AB" valve to the brake pipe, so that said valve may then be controlled from the brake pipe, in the usual manner.

Other objects and advantages will be apparent from the following more detailed description of the invention.

In the accompanying drawing the single figure is a diagrammatic view of an "AB" brake equipment having associated therewith brake release means embodying the invention.

Description

As shown in the drawing, the brake equipment comprises an "AB" valve 1 embodying a pipe bracket 2, a service portion 3 mounted on one face of said bracket, an emergency portion 4 mounted on another face of said bracket, and other parts which while shown in elevation, do not enter into the invention and will not therefore be described. The brake equipment further comprises the usual auxiliary reservoir 5, emergency reservoir 6, brake cylinder device 7 and, according to the invention, the brake releasing valve device 8 arranged for attachment to the pipe bracket 2.

The service portion 3 comprises a piston 10 having at one side a piston chamber 11 which is normally in communication with a brake pipe 12 by way of a passage 13 and through the brake releasing valve device 8, as will be hereinafter described. At the opposite side of piston 10 is a valve chamber 14 in constant communication with the auxiliary reservoir 5 by way of a passage and pipe 15, a branch of said passage extending to the brake releasing valve device 8. The valve chamber 14 contains a slide valve 17 and an auxiliary slide valve 18 arranged for control by the piston 10 in the usual manner.

When the brake pipe 12 and piston chamber 11 are charged with fluid under pressure, and piston 10 is in its brake release position as shown, fluid will flow from said piston chamber through a feed groove 19 around said piston to valve chamber 14 and thence through passage and pipe 15 to the auxiliary reservoir 5 to charge same to the same pressure as that in the brake pipe. With piston 10 and slide valves 17 and 18 in release position, fluid under pressure flows from valve chamber 14 through a port 20 in the main slide valve to a passage 21, and thence to a connected passage 21a. Fluid under pressure thus supplied to passage 21a flows to the emergency reservoir 6 by way of a connected passage and pipe 21b for charging said reservoir to brake pipe pressure. Also in the release position of the main slide valve 17 the brake cylinder is open to the atmosphere through a pipe 22, passage 23, past check valve 24 in the emergency portion 4 of the control valve device 1, and thence through passages 25 and 26, a cavity 26a in said slide valve and a release passage 27.

Upon a reduction in pressure in brake pipe 12 and thus in piston chamber 11 at either a service or an emergency rate, the piston 10 is adapted to move into sealing engagement with a gasket 28 which is clamped between the pipe bracket 2 and the casing of the service portion 3. During such movement the piston first shifts the auxiliary slide valve 18 relative to the main slide valve 17 to a position lapping port 20 and opening a service port 29 to the valve chamber 14, and then shifts both slide valves in unison to a position in which the brake cylinder passage 26 is disconnected from the release passage 27 and in which the service port 29 registers with passage 26. Fluid under pressure then flows from the auxiliary reservoir 5 to the brake cylinder device 7 and actuates same to apply the brakes on the vehicle.

Upon a subsequent increase in brake pipe pressure for effecting a release of brakes, the piston 10 and slide valves 17 and 18 are returned to their normal position in which they are shown and in which the auxiliary reservoir 5 is supplied with fluid from the brake pipe by way of feed groove 19 and from the emergency reservoir 6 by way of port 20 until substantial equalization of the pressures in both auxiliary and emergency reservoirs occurs, when both reservoirs charge to the normal pressure in the brake pipe as before described.

Also in this position of the main slide valve 17 the brake cylinder device 7 is disconnected from the auxiliary reservoir 5 and opened to the atmosphere for releasing the brakes.

The emergency valve portion 4 comprises an emergency piston 32 having at one side a chamber 33 which is normally open to the brake pipe by way of passage 13 and the brake releasing valve device 8, and having at the opposite side, a valve chamber 34 open to a quick action chamber 35. The valve chamber 34 contains a main slide valve 36 and an auxiliary slide valve 37 mounted on the main slide valve, the two slide valves being connected for movement by piston 32 in the usual manner.

When the brake pipe 12 and thereby the emergency piston chamber 33 are charged with fluid under pressure, the emergency piston 32 and slide valves 36 and 37 will occupy their normal position, in which they are shown. With the slide valve in this position, a feed port 38 is open to piston chamber 33 for supplying fluid under pressure from the brake pipe to valve chamber 34 and quick action chamber 35 to charge same with fluid at the same pressure as in the brake pipe.

Upon a service reduction in pressure in piston chamber 33, in response to a service reduction in brake pipe pressure, the emergency piston and thereby the auxiliary slide valve 37 will move in the direction of said chamber to a position in which a port 39 in the auxiliary slide valve registers with a port 40 in the main slide valve, and through these registering ports fluid will then flow from the valve chamber and quick action chamber 35 to a passage 41 and thence to the atmosphere. This release of fluid under pressure from the valve chamber 34 and quick action chamber 35 will reduce the pressure in said chambers at the same rate as the brake pipe pressure acting on the opposite side of the piston 32 reduces upon a service rate of reduction in brake pipe pressure, so as to thereby stop movement of the piston 32 in the service position.

The venting capacity of ports 39 and 40 however is insufficient to reduce the pressure of fluid in valve chamber 34 as fast as the brake pipe pressure in piston chamber 33 reduces upon an emergency rate of reduction in brake pipe pressure, so that upon such a reduction, a differential is obtained between the pressure in piston chamber 33 and valve chamber 34 of such a degree as to cause said piston to move to an emergency position into engagement with a gasket 42 which is clamped between the pipe bracket 2 and the casing of the emergency portion 4. The emergency piston as it thus moves will shift the main slide valve 36 to an emergency position in which a passage 43 is opened to valve chamber 34. Fluid under pressure will then flow from valve chamber 34 and quick action chamber 35 to passage 43 and thence to a chamber 44 for actuating a piston 49 to unseat a brake pipe vent valve 45 past which a sudden quick venting of fluid under pressure from the brake pipe 12 then occurs by way of a passage 110. The fluid pressure in valve chamber 34 and quick action chamber 35 will then be gradually dissipated through a port 46 in piston 49 to permit closure of the vent valve 45 after a certain lapse of time.

In emergency position of the main slide valve 34 a cavity 47 therein connects the emergency reservoir passage 21a to passage 26 which upon an emergency reduction in brake pipe pressure is supplied with fluid under pressure from the auxiliary reservoir 5 by operation of the service application valve device 3 as hereinafter described. Fluid under pressure from both the auxiliary and emergency reservoirs will thus be supplied to passage 26 upon an emergency reduction in brake pipe pressure and such fluid will initially flow past check valve 24 to the brake cylinder device 7. The check valve 24 is arranged to close upon an increase in brake cylinder pressure following which further flow of fluid to the brake cylinder device will occur through a choke 48 and finally by way of a timing check valve 48a which also opens as is well known. Thus an emergency application of the brakes is effected.

This specific control of the flow of fluid from the two reservoirs to the brake cylinder device is immaterial to the present invention and a further description thereof is not deemed essential, since it is merely desired to bring out that upon an emergency reduction in brake pipe pressure, the auxiliary reservoir 5 is placed in communication with the brake cylinder device 7 by operation of the service valve portion 3, and the emergency reservoir 6 is placed in communication with the brake cylinder device by operation of the emergency valve device 4, and the fluid pressure in both of said reservoirs is therefore permitted to equalize into the brake cylinder device to effect the emergency application of the brakes.

It is also desired to bring out that after an emergency application of the brakes is completed, the brake pipe 12, emergency valve chamber 34, and quick action chamber 35 will be at atmospheric pressure so that the emergency slide valve 36 will remain in its emergency position. The parts of the service application valve device will also remain in their application position with the brake pipe completely vented since the service piston is subject at this time in valve chamber 14 to the pressure of fluid in the auxiliary reservoir 5 which will be equalized with that in the emergency reservoir into the brake cylinder device 7 at a value such as sixty pounds, assuming the brake pipe pressure preceding the emergency reduction was seventy pounds. Thus at the termination of an emergency application of brakes the service piston 10 will be held in emergency position by auxiliary reservoir pressure, while the emergency piston will be subject on opposite sides to fluid at substantially atmospheric pressure.

In order to release an emergency application of the brakes, fluid under pressure will be supplied to the brake pipe 12 and thence to piston chambers 11 and 33 for increasing the pressure of fluid acting on the service and emergency pistons 10 and 32, respectively. Upon a slight increase in the pressure of fluid in chamber 33 the emergency piston 32 will move out of its emergency position and back to its normal position which is defined by its contact with a plunger 51 which is subject to the pressure of a spring 52. The piston 32 as it is thus moved will shift the main slide valve 36 back to its normal position in which passage 21 from the emergency reservoir 6 is lapped, thereby closing communication between said reservoir and passage 26, which passage 26 at this time is still open to the brake cylinder device 7 and to the auxiliary reservoir 5 by way of the service valve portion 3.

Also in the normal position of the emergency piston 32, the port 38 is open to chamber 33, so that fluid will then flow from the brake pipe to valve chamber 34 and the quick action chamber 35 for charging same. The rate of increase in brake pipe pressure for releasing the brakes sufficiently exceeds the rate of charging of the valve chamber 34 by way of feed port 38, as to provide a faster increase in pressure in piston chamber 33 than occurs in valve chamber 34, so that by the time the brake pipe pressure acting in chamber 33 is increased to a relatively low degree, such as ten pounds, a sufficient differential in pressure will be provided on piston 32 to overcome the pressure of spring 52 on plunger 51 and move the piston 32 past its release position to a back-dump position defined by contact between said piston and a stop 53 in the casing.

In this back-dump position of the main slide valve 36, the cavity 47 opens communication between passage 26 and a passage 54 and fluid under pressure from the brake cylinder device 7 and connected auxiliary reservoir 5 will flow to passage 54 and thence past two serially arranged check valves 55 to a passage 56 which is open to the brake pipe 12. Since the emergency brake applying pressure in the brake cylinder and auxiliary reservoir may be around sixty pounds, as hereinbefore mentioned and the pressure of fluid in the brake pipe 12 may be at a relatively low degree, such as ten pounds at the time the emergency valve moves to back-dump position, the fluid from the brake cylinder device 7 and connected auxiliary reservoir supplied to the brake pipe will therefore cause a local increase in pressure therein to about forty-five pounds, thus hastening the recharge of the brake pipe 12 and thereby the release of brakes following an emergency application. Upon substantial equalization of the pressure of fluid in the brake cylinder device 7 and auxiliary reservoir 5 into the brake pipe 12, the upper check valve 55 will seat under the action of a spring 57 to prevent back flow of fluid from the brake pipe upon a further normal increase in brake pipe pressure back to its normal value. During this further increase in brake pipe pressure the valve chamber 34 and quick action chamber 35 will become charged to the same pressure as in the brake pipe by way of feed port 38. Upon substantial equalization of these pressures spring 52 acting on plunger 51 will return the emergency piston 32 and the slide valves 36 and 37 to their normal positions.

When the brake pipe pressure effective in chamber 11 of the service portion 3 is increased to a degree slightly exceeding the reduced auxiliary reservoir pressure in valve chamber 14, said piston will operate to return the slide valves 17 and 18 to their normal release position in which they are shown, in which position, communication is closed between the brake cylinder device 7 and the auxiliary reservoir 5 and said reservoir is recharged with fluid under pressure from the brake pipe, and the brake cylinder device is opened to atmosphere for releasing the brakes. Also in this position of the slide valve 17, the emergency reservoir 6 is again opened to valve chamber 14 and is therefore recharged with fluid at the pressure in the brake pipe.

Briefly summarizing the operations above described for a clear understanding of the operation of the reservoir releasing valve device 8 which follows, it will be noted that upon an emergency reduction in brake pipe pressure from a normal degree such as seventy pounds, both the auxiliary reservoir 5 and emergency reservoir 6 are opened to the brake cylinder device 7 and the pressures of fluid in said reservoirs equalize into said brake cylinder device at substantially sixty pounds. Upon a subsequent increase in brake pipe pressure to effect a release of the emergency brake application, the several parts of the emergency valve device 4 move to back-dump position upon a relatively small increase in brake pipe pressure to disconnect the emergency reservoir from the brake cylinder device 7, thereby holding in the emergency reservoir fluid at substantially sixty pounds pressure. In this back-dump position the pressure of fluid in the brake cylinder device 7, auxiliary reservoir 5 and brake pipe 12 equalize at substantially forty-five pounds which results in a reduction in pressure in said reservoir and brake cylinder device to about forty-five pounds. When the brake pipe pressure is then increased above this pressure (forty-five pounds) effective in the auxiliary reservoir, the piston 10 and slide valves 17 and 18 are returned to their normal position. With the slide valves in this position, communication is closed between the auxiliary reservoir and the brake cylinder device, and said reservoir is recharged with fluid under pressure from the brake pipe, and the brake cylinder device is opened to the atmosphere for releasing the brakes. Also with the parts of the service portion 3 returned to their normal position, communication is open between the auxiliary reservoir and the emergency reservoir to allow charging of the latter to the brake pipe pressure.

A more complete description of the "AB" valve is not deemed essential to a clear understanding of the invention but if further information as to the functioning of the "AB" valve is desired, reference may be had to Clyde C. Farmer, Patent No. 2,031,213, issued February 18, 1936.

*Description—Brake releasing valve device 8*

The brake releasing valve device 8 comprises a casing 60, which is preferably mounted on the pipe bracket 2 and is provided with passages which form extensions of the passages 15, 21b, 28 and 27 in the pipe bracket and are connected respectively to the auxiliary reservoir 5, emergency reservoir 6, brake cylinder device 7 and the atmosphere. The casing 60 is also provided with a passage 65 and a passage 66 which align respectively with the usual brake pipe passage 13 and a new passage 67 in the pipe bracket 2, the latter passage leading to the usual quick action chamber 35.

The casing 60 is also provided with a valve chamber 70 which is in constant open communication with the brake pipe 12 by way of a passage and branch pipe 71. Contained in this chamber is a slide valve 72 which is mounted between two spaced shoulders on a stem 73 which is connected to one side of a flexible diaphragm 74 clamped around its periphery in the casing. Engaging a diaphragm follower at the opposite side of the diaphragm 74 is a push rod 75 mounted to slide in a suitable bore through the casing and a chamber at this side of the diaphragm is in constant open communication with a passage 76 which leads to the seat for the slide valve 72 by way of a chamber 85 and a passage 76a.

The push rod 75 is provided for manual operation to deflect the diaphragm 74 and to move the slide valve 72 from a normal position, in which it is shown in the drawing, in the direction of the right-hand to a second position defined by a stop shoulder 78 provided on stem 73 engaging a stop or lock member 79 constituting a part of a stop mechanism 80 hereinafter described. For deflecting the diaphragm 74 to thereby effect movement of the slide valve 72 into this second position the outer end of the push rod 75 may be connected by any conventional means (not shown) to opposite sides of a car for operation by a trainman.

A rockable strut 81 having one end in contact with the casing within a recess extends through a suitable slot in the diaphragm stem and into a recess in the slide valve 72 wherein it has rocking engagement with said slide valve. This strut is provided with a collar 82 between which collar and the casing is interposed a spring 83 which acts through the medium of the strut to hold the slide valve seated at all times.

The stop mechanism 80 hereinbefore mentioned is contained in the casing 60 and comprises a flexible diaphragm 84 having at its upper face a chamber 85 which is in constant open communication with the passages 76 and 76a. At the opposite or lower side of this diaphragm there is a chamber 86 which is in constant open communication with the valve chamber 70 by way of a passage 87. Connected to the lower side of the diaphragm 84 is a diaphragm follower 88 to which the stop or lock member 79 is attached, which member is suitably guided in the casing and provided with an opening through which the diaphragm stem 73 extends. Contained in chamber 86 and interposed between and operatively engaging the diaphragm follower 88 and the casing is a spring 90 which tends at all time to urge the diaphragm 84 and attached member 79 to their stop position, in which position they are shown in the drawing.

When the brake pipe 12 is charged with fluid under pressure, such pressure effective in valve chamber 70 on the right-hand face of diaphragm 74 maintains the diaphragm 74 and the slide valve 72 in their normal position in which they are shown in the drawing unless manually moved by the push rod 75 as will be later described.

In this normal position of slide valve 72, passage 65 is open to valve chamber 70 thus connecting brake pipe 12 to passage 13 in the pipe bracket of the "AB" valve so that said valve may operate in response to variations in pressure in the brake pipe to apply and release the brakes in the usual manner as above described without any interference from the releasing valve device 8.

If a car provided with the brake releasing valve device 8 is cut out of a train and the brake pipe 12 is vented to the atmosphere in the usual manner, the "AB" valve will operate to cause an emergency application of the brakes in the same manner as above described, it being noted that the piston chambers 11 and 33 will both be opened to the vented brake pipe 12 by way of passage 13, past the slide valve 72 and thence through valve chamber 70 and passage and pipe 71.

With the brakes on the car thus applied and the brake pipe 12 and thereby piston chambers 11 and 33 open to the atmosphere, let it be assumed that it is desired to release the fluid under pressure from the brake cylinder device 7 for releasing the brakes, without recharging the brake pipe 12 and without losing the stored fluid pressure in the auxiliary and emergency reservoir 5 and 6, respectively.

To accomplish this a trainman from a position at the side of the car will push the plunger 75 inwardly and thereby deflect the diaphragm 74 from its normal position, in which it is shown, in a direction toward the right-hand. Deflection of the diaphragm in this direction causes the attached stem 73 and slide valve 72 to move in the same direction until brought to a stop by the engagement of the shoulder 78 on the stem with the stop member 79. With the slide valve in this position, communication between passage 65 and chamber 70 and thereby the brake pipe 12 is closed and passage 65 is connected through a cavity 92 in the slide valve 72 to an extension of passage 15 which is connected to the auxiliary reservoir. At the same time passage 76a is connected through a cavity 93 in the slide valve 72 to passage 66—67 which is connected to the quick action chamber 35.

With communication between passages 65 and 15 thus established, fluid under pressure flows from the auxiliary reservoir 5 and thereby from the connected brake cylinder to the service and emergency piston chambers 11 and 33. When due to this flow, a slight increase in pressure is attained in chamber 33 at one side of the emergency piston 32, the opposite side of which is at this time subject to atmospheric pressure, said piston will move to the position in which it is shown in the drawing in which position communication is closed between the emergency reservoir 6, and the auxiliary reservoir 5 and the brake cylinder device 7. In this position, the feed port 38 is opened to the piston chamber 33 to permit flow of fluid from said chamber to valve chamber 34 and the connected quick action chamber 35. The supply communication leading from the auxiliary reservoir and brake cylinder to the piston chamber 33 have a flow capacity exceeding that of the feed port 38, so as to thereby provide a more rapid increase in pressure in piston chamber 33 than is obtained in valve chamber 34. As a result, a differential in pressure will be created on the emergency piston 32 and when this differential is increased to about ten pounds, said piston will act to position the slide valve 36 in the back-dump position above described, movement of the piston being opposed by the spring weighted plunger 51. Fluid under pressure will then flow from the auxiliary reservoir 6 and brake cylinder device 7 through cavity 47 in the slide valve 36 and thence past check valves 55 to passage 56 and into the connected piston chambers 11 and 33, thereby providing a relatively rapid increase in pressure in said chambers to about fifty-five pounds, thus equalizing the pressure of fluid in the auxiliary reservoir, brake cylinder and chambers 11 and 33. This increase in pressure in piston chambers 11 and 33 is greater than in the usual back-dump operation of the "AB" valve due to the brake pipe 12 on the car being disconnected at this time from said chambers by the slide valve 72 of the releasing valve device 8.

After this back-dump operation, fluid under pressure continues to flow from the emergency piston chamber 33 through feed groove 38 to valve chamber 34 and quick action chamber 35 for charging same. When the opposing pressures on the emergency piston 32 becomes substantially equal, the pressure of spring 52 acting on plunger 51 will return the piston 32 and associated slide valves to the position in which they are shown in the drawing. It will be noted that during this time the service piston 10 remains in its application position in sealing engagement with the gasket 28 since the auxiliary reservoir pressure effective in valve chamber 14 is at least equal to the opposing pressure (fifty-five pounds) now in chamber 11.

With the passages 66 and 76a connected, fluid under pressure supplied to quick action chamber 35 flows by way of passages 67 and 66, cavity 93 in the slide valve 72 and passage 76a to the chamber 85 above the diaphragm 84 in the stop mechanism 80, and from chamber 85 fluid under pressure flows through passage 76 to the chamber at the outer face of diaphragm 74. When the pressure of fluid thus supplied to chamber 85 has been increased to about forty-five pounds, the diaphragm 84 will deflect downwardly against the opposing pressure of the spring 90. Downward deflection of the diaphragm causes the diaphragm follower and attached member 79 to move in the same direction until brought to a stop by the engagement of the follower 88 with a stop 100 provided in the casing. With the follower in this position, the member 79 will be moved out of engagement with the shoulder 78 on the stem 73. Upon such movement of the member 79, the pressure of fluid effective in the chamber at the outer face of the diaphragm 74, the opposite side of which is at this time subject to atmospheric pressure due to the open communication from the chamber to the brake pipe by way of passage and pipe 71, causes said diaphragm to deflect further in a direction toward the right-hand. This further deflection of the diaphragm 74 causes the attached stem 73 and slide valve 72 to move in the same direction until brought to a stop by the engagement of a follower 101, attached to the diaphragm, with a stop 102 on the casing.

With the slide valve in this position, communication between passages 65 and 15 is closed and passage 65 is connected through cavity 92 to the passage 21b which is connected to the emergency reservoir 6. The cavity 93 in the slide valve maintains the passages 66 and 76a connected. With communication between passage 65 and 21b established, fluid under pressure in the emergency reservoir which at this time is substantially sixty pounds will flow by way of passage 21b, cavity 92 in the slide valve 72 and passages 65 and 13 to the piston chambers 33 and 11 thereby effecting an increase in the pressure in said chambers. The resulting increase in pressure in chamber 33 is immaterial, but the increase in pressure in chamber 11 on the service piston 10 is of a degree sufficiently in excess of the auxiliary reservoir pressure in chamber 14 at the opposite side of the piston 10 as to cause said piston and slide valves 17 and 18 to return to their release position for thereby disconnecting the auxiliary reservoir 5 from the brake cylinder device 7 and for opening said brake cylinder device to the atmosphere. Both the auxiliary and emergency reservoirs are thereby disconnected from the brake cylinder device and said device is opened to the atmosphere, thus providing for a release of the brakes on the car without losing the stored fluid pressure in said reservoirs.

When the car is subsequently cut into a train and the brake pipe 12 is again charged with fluid under pressure, the pressure in valve chamber 70 of the release valve device 8 will increase with that in the brake pipe 12, and when this pressure acting on diaphragm 74 has been increased to a degree slightly exceeding the pressure of fluid in the quick action chamber 35 and acting on the opposite side of diaphragm 74, the diaphragm 74 and thereby the slide valve 72 will be returned to their normal positions. With the slide valve in its normal position, in which position it is shown in the drawing, the passage 66 and thereby the quick action chamber 35 is disconnected from the passage 76a, and, passage 76a is connected to the atmosphere through cavity 93 in the slide valve 72 and an atmospheric passage 105. With the passage 76 thus connected to the atmosphere the pressure of fluid in connected chamber 85 and the chamber at the outer face of the diaphragm 74 are as a consequence reduced. Upon a reduction in pressure in chamber 85 to about forty-five pounds, the spring 90 acts through the medium of diaphragm follower 88 and diaphragm 84 to shift the member 79 upwardly to the position in which it is shown in the drawing.

The slide valve 72 upon movement to its normal position uncovers passages 65 to chamber 70 thus reconnecting the piston chambers 11 and 33 to the brake pipe 12 so that the "AB" valve will again operate in response to variations in pressure in the usual manner above described.

It will be noted that when the brake pipe 12 is being recharged, movement of diaphragm 74 and slide valve 72 to their normal position is delayed until such time as the brake pipe pressure in chamber 70 and acting on one side of the diaphragm is increased to a degree exceeding the pressure of fluid at quick action chamber pressure acting on the other side of the diaphragm. This delay will prevent a reduction in the pressure of fluid in the emergency piston chamber 33 and thereby insure against unwanted movement of the emergency piston 32 and associated slide valves to their emergency position in which the auxiliary and emergency reservoir are connected to the brake cylinder device. That such a reduction would occur if the brake releasing device 8 responded immediately to a slight increase in brake pipe pressure is obvious since the fluid at higher pressure in chamber 33 would flow back to the brake pipe which would not yet be charged to a pressure equal to the pressure of fluid in the chamber. This delay is attained by maintaining the outer face of diaphragm 74 in the release valve connected to the quick action chamber so as to hold the diaphragm 74 and slide valve 72 against movement from its brake release position until the brake pipe pressure is increased to a degree exceeding the pressure bottled up in said quick action chamber and connected auxiliary and emergency reservoirs.

The parts of the brake releasing valve device 8 will now remain in the position in which they are shown even though the pressure of fluid in the brake pipe 12 is reduced to atmospheric pressure as in effecting an emergency application of brakes. Movement of diaphragm 74 and slide valve 72 out of their normal position to their second position defined by contact of the shoulder 78 with the member 79 must be effected manually by rod 75 and movement to said third position will automatically result upon a given increase in pressure in the quick action chamber 35. The parts will then remain in this brake release position until such time as the recharging of the brake pipe 12 and valve chamber 70 is being effected with the car again cut into a train.

When the car is cut into the train and the piston chamber 11 and 33 are reconnected to the brake pipe 12 past slide valve 72, the air required from the brake pipe 12 for recharging the brake equipment is limited to that needed to increase the pressure of fluid in the auxiliary and emergency reservoirs from the degree retained therein by the brake releasing valve device 8 to the normal degree carried in the brake pipe; thus requiring less fluid pressure and less time for recharging the system than is ordinarily required where the two reservoirs are completely vented for obtaining a release of brakes.

*Summary*

From the foregoing description it will be apparent that when a car is set out of a train the brake pipe will be at atmospheric pressure and the fluid pressure brakes will be applied and that, to release the brakes without loss of the stored fluid pressure in the auxiliary and emergency reservoirs of the equipment all that is required is for a trainman to manually operate the brake releasing valve device to its brake cylinder venting position. It will also be apparent that when the car is again cut into a train and the charging of the brake pipe occurs the equipment will be automatically reset to provide for the usual well known operation of the "AB" equipment to control the application and release of the brakes.

Having now described my invention, what I claim as new and desire to secure by Letters Patent is:

1. In a fluid pressure brake equipment of the type comprising a brake pipe normally charged with fluid under pressure, an auxiliary reservoir and an emergency reservoir both normally charged with fluid under pressure, a brake cylinder, and a brake controlling valve device responsive to a reduction in brake pipe pressure to supply fluid under pressure from both of said reservoirs to said brake cylinder to effect an application of the brakes, and responsive to an increase in brake pipe pressure to isolate said reservoirs from the brake cylinder and to vent fluid under pressure from the brake cylinder to effect the release of the brakes, in combination, brake releasing control means interposed in the connection between the brake pipe and the brake controlling valve device and operative to a position to isolate the brake pipe from the brake controlling valve device and to supply fluid under pressure from said auxiliary reservoir and brake cylinder to the brake controlling valve device to effect the operation of the device to isolate the emergency reservoir from said auxiliary reservoir and brake cylinder and operative by fluid under pressure supplied from the auxiliary reservoir and brake cylinder to the brake controlling valve device to another position for supplying fluid under pressure from the emergency reservoir to the brake controlling valve device to effect the operation of the device to vent fluid under pressure from the brake cylinder to effect a release of the brakes.

2. In a fluid pressure brake equipment of the type comprising a brake pipe normally charged with fluid under pressure, an auxiliary reservoir and an emergency reservoir both normally charged with fluid under pressure, a brake cylinder, and a brake controlling valve device responsive to a reduction in brake pipe pressure to supply fluid under pressure from both of said reservoirs to said brake cylinder to effect an application of the brakes, and responsive to an increase in brake pipe pressure to isolate said reservoirs from the brake cylinder and to vent fluid under pressure from the brake cylinder to effect the release of the brakes, in combination, brake releasing control means operative manually to a position to isolate the brake pipe from the brake controlling valve device and to supply fluid under pressure from said auxiliary reservoir and brake cylinder to the brake controlling valve device to effect the operation of the device to isolate the emergency reservoir from said auxiliary reservoir and brake cylinder and operative by fluid under pressure supplied from the auxiliary reservoir and brake cylinder to the brake controlling valve device to another position for supplying fluid under pressure from the emergency reservoir to the brake controlling valve device to effect the operation of the device to vent fluid under pressure from the brake cylinder to effect a release of the brakes, and delay means for delaying operation of said brake releasing control means to said other position until the fluid under pressure supplied to the brake controlling valve device from said auxiliary reservoir and brake cylinder has been increased above a chosen value.

3. In a fluid pressure brake equipment of the type comprising a brake pipe normally charged with fluid under pressure, an auxiliary reservoir and an emergency reservoir both normally charged with fluid under pressure, a brake cylinder, and a brake controlling valve device responsive to a reduction in brake pipe pressure to supply fluid under pressure from both of said reservoirs to said brake cylinder to effect an application of the brakes, and responsive to an increase in brake pipe pressure to isolate said reservoirs from the brake cylinder and to vent fluid under pressure from the brake cylinder to effect the release of the brakes, in combination, brake releasing control means operative manually to a position to isolate the brake pipe from the brake controlling valve device and to supply fluid under pressure from said auxiliary reservoir and brake cylinder to the brake controlling valve device to effect the operation of the device to isolate the emergency reservoir from said auxiliary reservoir and brake cylinder and operative by fluid under pressure supplied from the auxiliary reservoir and brake cylinder to the brake controlling valve device to another position for supplying fluid under pressure from the emergency reservoir to the brake controlling valve device to effect the operation of the device to vent fluid under pressure from the brake cylinder to effect a release of the brakes, locking means for locking said brake releasing control means against operation to said other position, and means responsive to a predetermined increase in the pressure of fluid supplied to said brake controlling valve device from said auxiliary reservoir and brake cylinder to effect operation of said locking means to unlock said brake releasing control means.

4. In a fluid pressure brake equipment of the type comprising a brake pipe normally charged with fluid under pressure, an auxiliary reservoir and an emergency reservoir both normally charged with fluid under pressure, a brake cylinder, and a brake controlling valve device responsive to a reduction in brake pipe pressure to supply fluid under pressure from both of said reservoirs to said brake cylinder to effect an application of the brakes, and responsive to an increase in brake pipe pressure to isolate said reservoirs from the brake cylinder and to vent fluid under pressure from the brake cylinder to effect the release of the brakes, in combination, brake releasing control means operative manually to a position to isolate the brake pipe from the brake controlling valve device and to supply fluid under pressure from said auxiliary reservoir and brake cylinder to the brake controlling valve device to effect the operation of the device to isolate the emergency reservoir from said auxiliary reservoir and brake cylinder and operative by fluid under pressure supplied from the auxiliary reservoir and brake cylinder to the brake controlling valve device to another position for supplying fluid under pressure from the emergency reservoir to the brake controlling valve device to effect the operation of the device to vent fluid under pressure from the brake cylinder to effect a release of the brakes, spring means for locking said brake releasing control means in its first mentioned position, and movable abutment means operative upon a predetermined increase in the pressure of fluid supplied to said brake controlling valve device from said auxiliary reservoir and brake cylinder to effect operation of said spring means for unlocking said brake releasing control means.

5. In a fluid pressure brake equipment of the type comprising a brake pipe normally charged with fluid under pressure, an auxiliary reservoir and an emergency reservoir both normally charged with fluid under pressure, a brake cylinder, and a brake controlling valve device responsive to a reduction in brake pipe pressure to supply fluid under pressure from both of said reservoirs to said brake cylinder to effect an application of the brakes, and responsive to an increase in brake pipe pressure to isolate said reservoirs from the brake cylinder and to vent fluid under pressure from the brake cylinder to effect the release of the brakes, in combination, a brake releasing valve device including a slide valve operative manually to a position to supply fluid under pressure from said auxiliary reservoir to the brake controlling valve device to effect the operation of said brake controlling valve device to isolate the emergency reservoir from the auxiliary reservoir and brake cylinder, said slide valve being operative by fluid under pressure supplied from the auxiliary reservoir to the brake controlling valve device to another position for admitting fluid under pressure from the emergency reservoir to the brake controlling valve device to effect the operation of the brake controlling valve device to maintain the emergency reservoir isolated from the brake cylinder and to vent fluid under pressure from the brake cylinder to effect a release of the brakes.

6. In a fluid pressure brake equipment of the type comprising a brake pipe normally charged with fluid under pressure, an auxiliary reservoir and an emergency reservoir both normally charged with fluid under pressure, a brake cylinder, and a brake controlling valve device responsive to a reduction in brake pipe pressure to supply fluid under pressure from both of said reservoirs to said brake cylinder to effect an application of the brakes, and responsive to an increase in brake pipe pressure to isolate said reservoirs from the brake cylinder and to vent fluid under pressure from the brake cylinder to effect the release of the brakes, in combination, a slide valve operative to one position to isolate the brake pipe from the brake controlling valve device and to supply fluid under pressure from said auxiliary reservoir and brake cylinder to the brake controlling valve device to effect the operation of the device to isolate the emergency reservoir from said auxiliary reservoir and brake cylinder, and to another position for supplying fluid under pressure from the emergency reservoir to the brake controlling valve device to effect the operation of the device to vent fluid under pressure from the brake cylinder to effect a release of the brakes, manually operable means for actuating said slide valve to said one position, means operative in response to the pressure of fluid supplied to said brake controlling valve device from said auxiliary reservoir and brake cylinder for actuating said slide valve from said one position to said other position, and delay means for delaying operation of the last mentioned means until the pressure of fluid supplied thereto has been increased above a chosen value.

7. In a fluid pressure brake equipment of the type comprising a brake pipe; an auxiliary reservoir; an emergency reservoir; and a brake cylinder; in combination, a brake controlling valve device; a passage connecting said brake pipe to said brake controlling valve device; said brake controlling valve device being operable upon a reduction in pressure in said passage to open communication between said auxiliary and said emergency reservoirs and the brake cylinder to effect an application of the brakes; a release control valve having a normal position, a second position and a third position; said release valve being operative in said normal position for opening said passage to said brake pipe and being operative in said second position for closing communication between said brake pipe and passage and for supplying fluid under pressure from said brake cylinder and said auxiliary reservoir to said passage to effect operation of said brake controlling valve device to cut off the supply of fluid under pressure from said emergency reservoir to said brake cylinder, and being operative in said third position for supplying fluid under pressure from said emergency reservoir to said passage to effect operation of said brake controlling valve device to open said brake cylinder to the atmosphere to effect a release of the brakes, and means for controlling the positioning of said release control valve.

8. In a fluid pressure brake equipment of the type comprising a brake pipe; an auxiliary reservoir; an emergency reservoir; and a brake cylinder; in combination, a brake controlling valve device; a passage connecting said brake pipe to said brake controlling valve device; said brake controlling valve device being operable upon a reduction in pressure in said passage to open communication between said auxiliary and said emergency reservoirs and the brake cylinder to effect an application of the brakes; a release control valve having a normal position, a second position and a third position; said release valve being operative in said normal position for opening said passage to said brake pipe and being operative in said second position for closing communication between said brake pipe and passage and for supplying fluid under pressure from said brake cylinder and said auxiliary reservoir to said passage to effect operation of said brake controlling valve device to cut off the supply of fluid under pressure from said emergency reservoir to said brake cylinder, and being operative in said third position for supplying fluid under pressure from said emergency reservoir to said passage to effect operation of said brake controlling valve device to open said brake cylinder to the atmosphere to effect a release of the brakes, and means for controlling the positioning of said release control valve, said means comprising a manually operative member for effecting movement of said release control valve from said normal position to said second position, and fluid pressure responsive means for effecting movement of said release control valve from said second position to said third position.

9. In a fluid pressure brake equipment of the type comprising a brake pipe; an auxiliary reservoir; an emergency reservoir; and a brake cylinder; in combination, a brake controlling valve device; a passage connecting said brake pipe to said brake controlling valve device; said brake controlling valve device being operable upon a reduction in pressure in said passage to open communication between said auxiliary and said emergency reservoirs and the brake cylinder to effect an application of the brakes; a release control valve having a normal position, a second position and a third position; said release valve being operative in said normal position for opening said passage to said brake pipe and being operative in said second position for closing communication between said brake pipe and passage and for supplying fluid under pressure from said brake cylinder and said auxiliary reservoir to said passage to effect operation of said brake controlling valve device to cut off the supply of fluid under pressure from said emergency reservoir to said brake cylinder, and being operative in said third position for supplying fluid under pressure from said emergency reservoir to said passage to effect operation of said brake controlling valve device to open said brake cylinder to the atmosphere to effect a release of the brakes, a manually operable member for effecting movement of said release control valve from said normal position to said second position; a chamber; and movable abutment means subject to the opposing pressures of fluid in said brake pipe and said chamber operative upon a decrease in brake pipe pressure and an increase in pressure in said chamber for effecting movement of said release control valve from said second position to said third position.

10. In a fluid pressure brake equipment of the type comprising a brake pipe; an auxiliary reservoir; an emergency reservoir; and a brake cylinder; in combination, a brake controlling valve device; a passage connecting said brake pipe to said brake controlling valve device; said brake controlling valve device being operable upon a reduction in pressure in said passage to open communication between said auxiliary and said emergency reservoirs and the brake cylinder to effect an application of the brakes; a release control valve having a normal position, a second position and a third position; said release valve being operative in said normal position for opening said passage to said brake pipe and being operative in said second position for closing communication between said brake pipe and passage and for supplying fluid under pressure from said brake cylinder and said auxiliary reservoir to said passage to effect operation of said brake controlling valve device to cut off the supply of fluid under pressure from said emergency reservoir to said brake cylinder, and being operative in said third position for supplying fluid under pressure from said emergency reservoir to said passage to effect operation of said brake controlling valve device to open said brake cylinder to the atmosphere to effect a release of the brakes, a manually operable member for effecting movement of said release control valve from said normal position to said second position; a chamber; and movable abutment means including a flexible diaphragm subject to the opposing pressures of fluid in said brake pipe and said chamber operable by brake pipe pressure to actuate said release control valve to its normal position, operable manually to actuate said release control valve from said normal position to said second position and operable by the pressure of fluid in said chamber to actuate said release control valve from second position to said third position.

11. In a fluid pressure brake equipment of the type comprising a brake pipe; an auxiliary reservoir; an emergency reservoir; and a brake cylinder; in combination, a brake controlling valve device; a passage connecting said brake pipe to said brake controlling valve device; said brake controlling valve device being operable upon a reduction in pressure in said passage to open communication between said auxiliary and said emergency reservoirs and the brake cylinder to effect an application of the brakes; a release control valve having a normal position, a second position and a third position; said release valve being operative in said normal position for opening said passage to said brake pipe and being operative in said second position for closing communication between said brake pipe and passage and for supplying fluid under pressure from said brake cylinder and said auxiliary reservoir to said passage to effect operation of said brake controlling valve device to cut off the supply of fluid under pressure from said emergency reservoir to said brake cylinder, and being operative in said third position for supplying fluid under pressure from said emergency reservoir to said passage to effect operation of said brake controlling valve device to open said brake cylinder to the atmosphere to effect a release of the brakes, means comprising a manually operable member for effecting movement of said release control valve from said normal position to said second position, and fluid pressure responsive means for effecting movement of said release control valve from said second position to said third position; a chamber, and means operative to maintain said release valve in said second position, so long as the pressure in said chamber is not increased above a chosen value.

12. In a fluid pressure brake equipment of the type comprising a brake pipe; an auxiliary reservoir; an emergency reservoir; and a brake cylinder, in combination, a brake controlling valve device; a passage connecting said brake pipe to said brake controlling valve device; said brake controlling valve device being operable upon a reduction in pressure in said passage to open communication between said auxiliary and said emergency reservoirs and the brake cylinder to effect an application of the brakes; a release control valve having a normal position, a second position and a third position; said release valve being operative in said normal position for opening said passage to said brake pipe and being operative in said second position for closing communication between said brake pipe and passage and for supplying fluid under pressure from said brake cylinder and said auxiliary reservoir to said passage to effect operation of said brake controlling valve device to cut off the supply of fluid under pressure from said emergency reservoir to said brake cylinder, and being operative in said third position for supplying fluid under pressure from said emergency reservoir to said passage to effect operation of said brake controlling valve device to open said brake cylinder to the atmosphere to effect a release of the brakes, means comprising a manually operable member for effecting movement of said release control valve from said normal position to said second position and fluid pressure responsive means for effecting movement of said release control valve from said second position to said third position; a chamber; and means including a locking member operative to delay movement of said valve from said second position to said third position until the pressure of fluid in said chamber has been increased to a chosen value.

13. In a fluid pressure brake equipment of the type comprising a brake pipe; an auxiliary reservoir; an emergency reservoir; and a brake cylinder; in combination, a brake controlling valve device of the type comprising a service portion and an emergency portion; a passage connecting said brake pipe to said brake controlling valve device; said service portion being operable upon a reduction in pressure in said passage to open communication between said auxiliary reservoir and the brake cylinder and said emergency portion being operable upon a reduction in pressure in said passage to open communication between said emergency reservoir and the brake cylinder to effect an application of the brakes; a chamber; a release valve having a normal position, a second position and a third position; said release valve being operative in said normal position for opening said passage to said brake pipe, and operative in said second position for closing communication between said brake pipe and passage and for supplying fluid under pressure to said chamber, and for supplying fluid under pressure to said passage to effect operation of said emergency portion to cut off the supply of fluid under pressure from said emergency reservoir to the brake cylinder, and operative in said third position for supplying fluid under pressure from said emergency reservoir to said passage to effect operation of said service portion to open said brake cylinder to the atmosphere to effect a release of the brakes, means comprising a manually operative member for effecting movement of said release valve from said normal position to said second position and fluid pressure responsive means automatically operative for effecting movement of said release valve from said second position to said third position, and locking means operative to lock said release valve in its second position until the pressure of fluid in said chamber is increased to a predetermined value.

14. In a fluid pressure brake equipment of the type comprising a brake pipe; an auxiliary reservoir; an emergency reservoir; and a brake cylinder, in combination, a brake controlling valve device of the type comprising a service portion and an emergency portion; a passage connecting said brake pipe to said brake controlling valve device; said service portion being operable upon a reduction in pressure in said passage to open communication between said auxiliary reservoir and the brake cylinder and said emergency portion being operable upon a reduction in pressure in said passage to open communication between said emergency reservoir and the brake cylinder to effect an application of the brakes; a chamber; a release valve having a normal position, a second position and a third position; said release valve being operative in said normal position for opening said passage to said brake pipe, and operative in said second position for closing communication between said brake pipe and passage and for supplying fluid under pressure to said chamber, and for supplying fluid under pressure to said passage to effect operation of said emergency portion to cut off the supply of fluid under pressure from said emergency reservoir to the brake cylinder, and operative in said third position for supplying fluid under pressure from said emergency reservoir to said passage to effect operation of said service portion to open said brake cylinder to the atmosphere to effect a release of the brakes, manually operative means for effecting movement of said release valve from said normal position to said second position, fluid pressure responsive means automatically operative for effecting movement of said release valve from said second to said third position, and means for delaying the operation of said fluid pressure responsive means until the pressure of fluid in said chamber is increased to a chosen value.

RALPH T. WHITNEY.